United States Patent
Hippeläinen

(10) Patent No.: US 6,738,906 B1
(45) Date of Patent: May 18, 2004

(54) MARKING OF ELECTRONIC DOCUMENTS IN ORDER TO EXPOSE UNAUTHORIZED PUBLICATION

(75) Inventor: Lassi Hippeläinen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/269,484

(22) PCT Filed: Sep. 29, 1997

(86) PCT No.: PCT/FI97/00587

§ 371 (c)(1),
(2), (4) Date: Mar. 29, 1999

(87) PCT Pub. No.: WO98/14858

PCT Pub. Date: Apr. 9, 1998

(30) Foreign Application Priority Data

Sep. 30, 1996 (FI) .................................................. 963925

(51) Int. Cl.[7] .............................. H04L 9/00; G06F 17/60
(52) U.S. Cl. ......................... 713/200; 705/51; 705/57; 369/47.1; 380/201; 713/165
(58) Field of Search ................. 713/165, 182–185, 713/176, 189, 200–202; 705/51, 52, 57–59; 380/201, 277, 227–233; 369/44, 26, 47.1

(56) References Cited

U.S. PATENT DOCUMENTS

| | | | | |
|---|---|---|---|---|
| 5,014,234 A | * | 5/1991 | Edwards, Jr. ................ | 713/200 |
| 5,052,040 A | * | 9/1991 | Preston et al. ............... | 713/165 |
| 5,239,648 A | * | 8/1993 | Nukui .......................... | 707/10 |
| 5,289,540 A | * | 2/1994 | Jones .......................... | 713/165 |
| 5,295,266 A | * | 3/1994 | Hinsley et al. .............. | 709/101 |
| 5,467,447 A | | 11/1995 | Vogel | |
| 5,629,980 A | * | 5/1997 | Stefik et al. .................. | 705/54 |
| 5,634,012 A | * | 5/1997 | Stefik et al. .................. | 705/39 |
| 5,638,443 A | * | 6/1997 | Stefik et al. .................. | 702/24 |
| 5,699,427 A | * | 12/1997 | Chow et al. .................. | 705/58 |
| 5,715,403 A | * | 2/1998 | Stefik .......................... | 705/44 |

(List continued on next page.)

FOREIGN PATENT DOCUMENTS

| | | |
|---|---|---|
| EP | 0 459 046 | 12/1991 |
| EP | 0 798 619 | 10/1997 |
| WO | WO 89/07819 | 8/1989 |
| WO | WO 96/42151 | 12/1996 |

OTHER PUBLICATIONS

Doyle, "Microsoft Press Computer Dictionary" 1994, Microsoft Press, 2nd Edition, p. 173.*
Richter, "Q&A: Win32" March 1998, Microsoft Systems Journal, vol. 13, #3 p. 83–84.*
Brassil, et al. "Electronic Marking and Identification Techniques to Discourage Document Copying", *IEEE Journal on Selected Areas in Communications*, vol. 13, No. 8, Oct. 1995.
Copy of International Search Report for PCT/FI97/00587.

*Primary Examiner*—Emmanuel L. Moise
*Assistant Examiner*—Christopher Revak
(74) *Attorney, Agent, or Firm*—Squire, Sanders & Dempsey L.L.P.

(57) ABSTRACT

A method of marking information to be produced in order to expose unauthorized copying. In the method, a user identifier is defined, a source file containing a substantial part of the information produced is created, and a different target file is created for each user on the basis of the source file and the user identifier. In the invention, several predefined modification rules are stored in a file in order to modify the information contained in the source file. Using a digital processor, a sequence of modification keys is generated on the basis of the user identifier, the locations of the source file to be modified are defined, and modifications are made in these locations, determining the nature and/or position of the modifications on the basis of the predefined modification rules and modification keys. From the content of the target file delivered to the user, it is possible to conclude a user-specific identifier and thereby the person responsible for the unauthorized copy.

10 Claims, 3 Drawing Sheets

U.S. PATENT DOCUMENTS

| | | | |
|---|---|---|---|
| 5,787,175 A | * 7/1998 | Carter | 713/165 |
| 5,787,441 A | * 7/1998 | Beckhardt | 707/201 |
| 5,835,601 A | * 11/1998 | Shimbo et al. | 713/165 |
| 5,861,619 A | * 1/1999 | Horino et al. | 235/470 |
| 5,987,123 A | * 11/1999 | Scott et al. | 713/165 |
| 5,991,876 A | * 11/1999 | Johnson et al. | 713/200 |
| 6,011,847 A | * 1/2000 | Follendore, III | 713/160 |
| 6,073,123 A | * 6/2000 | Staley | 705/58 |

* cited by examiner

MARKING OF ELECTRONIC DOCUMENTS IN ORDER TO EXPOSE UNAUTHORIZED PUBLICATION

BACKGROUND OF INVENTION

The invention relates to a technique by which unauthorized publication and copying of electronic information can be exposed. The electronic information means particularly documents and programs distributed in an Internet type network.

The copying of electronically distributed information is technically very simple. For example, illegal copying of computer programs causes annual losses of milliards of dollars to software industry. Pirate copies are also a major problem in video and recording industry.

The common feature of all such information is that any protection of the information is based on copyright (or closely related forms of protection, such as data base protection), an agreement, or non-disclosure obligation. As previously known, the essential difference between copyright and industrial protection—such as patent and design protection—is that in industrial protection infringement is sufficiently shown if products can be shown to be similar, whereas to show infringement of copyright it must be shown that a product has been copied rather than created independently. The same applies not only to copyright, but also to infringement of commercial secrets and other non-disclosure obligations. Such infringement is particularly difficult to prove in respect of databases where information is, in principle, available to anyone, and any additional value produced by the information provider is based on advantageous selection or presentation of information. In the present application, the term 'copyright' should thus be understood in the wide sense to comprise commercial secrets, non-disclosure obligations, etc. as well as the actual author's rights. Correspondingly, a 'copyright proprietor' here refers to anyone who wants to prevent and/or expose unauthorized copying and/or publication of information.

Even if the copyright proprietor is able to show that the product has been copied without permission, he must also be able to indicate who is responsible for the copying. If an unauthorized copy is found in the possession of an end user who has bought the product in good faith, no compensation can usually be required from the end user. Further, the end user cannot be required to be able to or willing to expose who has sold the product.

For example, software suppliers use technology in which the software asks the user for his name and contact information in connection with the first installation. The information can be encoded in protected form and stored on an installation diskette. On the basis of this information the installation program produces a client identifier, which the client needs as he phones the supplier's telephone support. By monitoring incoming calls and their client identifiers the supplier may be able to expose unauthorized copying. The technology, however, has many defects and restrictions. For example, the technology is based on the assumption that the user will at some point need telephone support. This, however, is not always a correct assumption. Most information can be used even without obtaining subsequent support from the supplier. Since upon installing the software, the dishonest user can supply any contact information whatsoever, it is not always possible to conclude from the unauthorized copy where the copy has been made. By comparing installations conducted with different user information, the unauthorized user can conclude where on the disk the user-specific information is located, and change the information. The technique cannot be applied to protecting text and image files, since the added information is easy to delete.

It is also known to slightly modify e.g. the character spacing, font size, etc. in text documents. The idea is that the user will not notice if there are, for example, a few 11-point characters amidst 12-point text. This solution is previously known e.g. from U.S. Pat. No. 5,467,447. The technology, however, cannot be used for protecting electronically distributed text, since the unauthorized user can simply impose the same layout on all text. Even if a so protected text is delivered on paper, the dishonest user can supply the text to a text scanner, which removes all extra formatting.

BRIEF DESCRIPTION OF INVENTION

The object of the invention is thus to develop a technique by which unauthorized copying of electronically distributed information and the person responsible for the copying can be exposed. The objects of the invention are achieved with a technique that is characterized by what is stated in the independent claims. The preferred embodiments of the invention are claimed in the dependent claims.

The invention is based on the idea that the electronically distributed information is marked, i.e. modified to be different for each user. The modifications are not based on formatting, which can be easily changed, but are buried deep in the bit stream that carries the information. Differences are introduced in so many places in the versions delivered to different users that the unauthorized user cannot detect all the differences, or that it is not economically sensible to attempt to detect all the differences.

A known technique in which the information to be produced is marked in order to expose unauthorized publication comprises the steps of defining a user identifier, creating a source file containing a substantial part of the information produced, and creating a different target file for each user on the basis of the source file and the user identifier.

The method of the invention further comprises the steps of storing, in a file, several predefined modification rules for modifying the information contained in the source file, and by means of a digital processor:

generating a sequence of modification keys on the basis of the user identifier, defining the locations in the source file that are to be modified and making modifications in these locations, determining the nature and/or position of the modifications on the basis of the predefined modification rules and modification keys.

An advantage of the technique of the invention is that a user-specific identifier and thereby the person responsible for the unauthorized copy can be concluded from the information delivered to the user. The advantage obtained by keeping the modifications small is that the information content remains intact and that the unauthorized user will not detect the modifications. When modifications are made in a large number of various locations, the copying and the copier can be exposed even if the information is copied only in part.

BRIEF DESCRIPTION OF FIGURES

In the following the invention will be described in greater detail by means of preferred embodiments illustrated in the attached drawings, in which.

DETAILED DESCRIPTION OF INVENTION

Figure 1:
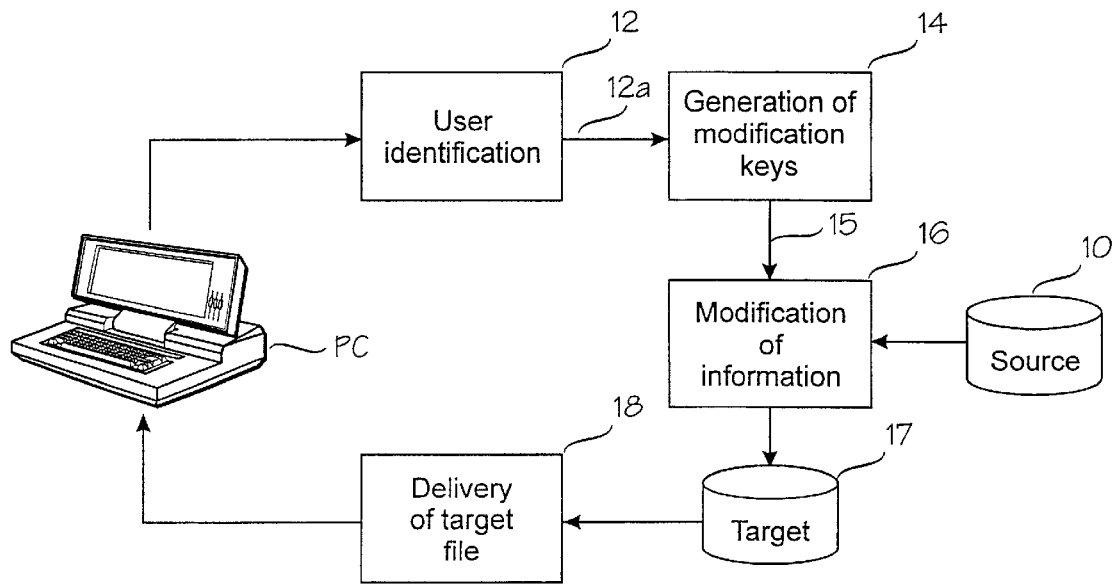
FIG. 1 is a block diagram illustrating a technique of the invention.

With reference to FIG. 1, we shall now describe different ways of implementing the technique of the invention in greater detail. Let us first define some of the terms used in the present application.

A 'document' is a general term referring to material at least some version of which is to be delivered to the PC user. The document can comprise text or numerical information, audio or video information, a computer program, or a combination of any of these.

A 'source' in phrases like 'source material' and 'source document' refers to material that is not protected and that would be delivered to the user in prior art solutions.

A 'target' in e.g. 'target document' refers to material that is protected by modifying it specifically for each user.

A 'file' means that the material is in a computer-readable form.

In FIG. 1 the source material provider (copyright proprietor) forms a source file 10 from the product. The function of a user identification block 12 is to define a user identifier. A sequence generator 14 generates sequences of modification keys on the basis of the user identifier, generating a different sequence for each user. A modification block 16, which receives an input of a source file 10 and a user-specific sequence, forms from them a user-specific target file 17. The file is delivered through a distribution channel 18. In the following the blocks and functions will be described in greater detail.

The user identification block 12 generates a user identifier 12a. In the present invention, any technique whatsoever known to the person skilled in the art can be used for identifying the user and generating the identifier 12a. The reliability of the identification technique should correspond to the importance of the information to be protected. In the field of electronic payment transfers, for example, it is common to use techniques that are based on client identifiers and passwords that are valid only once. The structure and operation of the identification block 12 depends on the transmission path on which the communication takes place, i.e. the user identifier 12a is received and the target document 17 is delivered. If the document is delivered by mail, e.g. on a diskette, the user identifier 12a can be based, for example, on the user's name or the number of his credit card. In the Internet, in particular, much information is distributed free of charge, whereby the information provider profits e.g. by gaining publicity. In a case where no actual user identification takes place, information about the user's identity can be obtained on the basis of the electronic address, such as the TCP/IP address or e-mail address. Where particularly valuable information is concerned, the user identifier can be checked e.g. by a call-back procedure.

Figure 2:
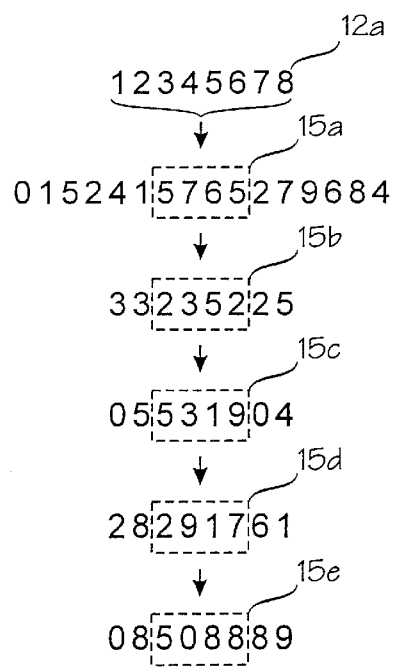
FIG. 2 illustrates,generating a modification key on the basis of a user identifier.

The sequence generator 14 receives, as an input, a user identifier 12a, and generates a sequence 15 that is different for each user. The sequence 15 can be, for example, a series of pseudo random numbers. A simple way of forming pseudo random numbers is to raise a 2N-digit seed number to the power of two, to take N middle digits of the number obtained, and to raise them to the power of two, and so on. The process is illustrated in FIG. 2, where the arrow pointing downward indicates where the raising to the power of two is conducted. For example, when the user identifier 12a, which has the value 12345678, is raised to the power of two, and the four middle digits of the number are taken, the first pseudo random number 15a—having the value 5765—is obtained. When this number is raised to the power of two and the four middle numbers are taken, the second pseudo random number 15b—having the value 2352—is obtained, and so on. If in such a sequence is obtained a number in which all the four middle digits are zeros, then the sequence degenerates to zero. This can be avoided e.g. by interpreting the N-digit number as a bit string, which is then divided into parts and between the parts are placed '1' bits.

As an alternative to the embodiment of FIG. 2, the user identifier 12acan be interpreted directly as a bit string from which a certain number of bits are used at each modification. When all the bits have been used, one starts to use the bit string all over again. If, for example, the user identifier has 40 bits and three bits are used for forming each modification key, then the 14th modification key can consist of the last bit, after which the first two bits can be used again, and so on.

The source file 10 created contains or is associated with irrelevant information, or redundancy, which can be modified individually for each user. Image and voice information always contains such redundancy. For example, in the loudest moments of a piece of music, the human ear cannot distinguish whether the least significant bit is modified or not. In a movie, the position of two frames can be changed without that the audience notices anything, and so on. Further, the elements of drawings can be in a different order in a file, and any markings in the drawings can be in slightly different positions or be of different size.

A text file comprises notably less redundancy. Likewise, the information rate is much lower. The information content of a typical type-written page is 2 kilobytes, and it takes several minutes to read it, whereas the information rate of CD-quality music is 150 kilobytes per second, and that of a TV signal is several megabytes per second. Redundancy, however, can be added to a text file by utilizing the fact that many words have synonyms, that the word order can sometimes be changed, etc. Small and capital letters can be varied, e.g. GSM, Gsm or gsm. Some words also have alternative spellings, such as 'disc' or 'disk'. Small letter/can sometimes be replaced by number 1, and capital O by 0, or vice versa. The order of blocks in computer programs can vary in a file. Even the instructions of the computer programs have several alternative forms: for example, the addition of 1 or subtraction of −1 give the same result.

Alternative bit strings can thus be added to a text file or to a source file of a computer program, for example as follows: {alternative 1/alternative 2/ . . . /alternative N}.

The modification block 16 receives, as inputs, a source file 10 and a user-specific sequence 15. On the basis of the source file 10 and the sequence 15, the block creates a different target file 17 for each user. At each alternative bit string, the modification block 16 converts an element 15a–15e of the sequence 15 to a number range corresponding to the number N of the alternatives. The processing is described in greater detail in FIG. 3. The modification block 16 reads a sentence 30 from the source file 10. The sentence, which serves as an example, contains two lists of alternative expressions 31 and 32, the former being here examined in greater detail. Reference 31a indicates where alternative list 31 begins. In this example, lists 31 and 32 begin with the sign {. Reference 31b indicates the first number of list 31, which shows how many of the alternatives of list 31 are used. If the alternative list 31 or 32 does not indicate the number of bit strings to be used, then one of the alternative bit strings is used. Here the list contains three alternatives 31c–31e, all of which are used. Reference 31f indicates a delimiter (here the sign /) between alternative bit strings, and reference 31g indicates the end of the list (here the sign }).

At each alternative list 31 and 32, the modification block 16 reads the random numbers 15a–15e, etc. and converts them to a number range corresponding to the number of alternatives. In the example of FIG. 2, the random numbers 15a–15e vary within the range 0 to 9999, and the first list of alternatives 31 comprises three alternatives. The range of the random numbers can simply be divided into three parts, the limits being 3333 and 6666. The first random number 15a is within the range 3333 to 6666, so the elements of the first list of alternatives 31 can be used in the order second, third, first. In the second alternative list 32 there are two alternatives, of which one is used. The value of the second random number 15b is 2352, which is less than half of the range (there are two alternatives). From the second list of alternatives 32, the first element is used. The alternative bit strings need not all be equally probable. In particular, when an alternative bit string is based on a misspelling made on purpose, the correct form can be selected with a high—e.g. 90 to 99%— probability. In alternative lists 31 and 32, for example, it is possible to use an indication (e.g. a different delimiter 31f) showing that some of the alternatives are misspellings that are highly unlikely to be selected.

Figure 3:
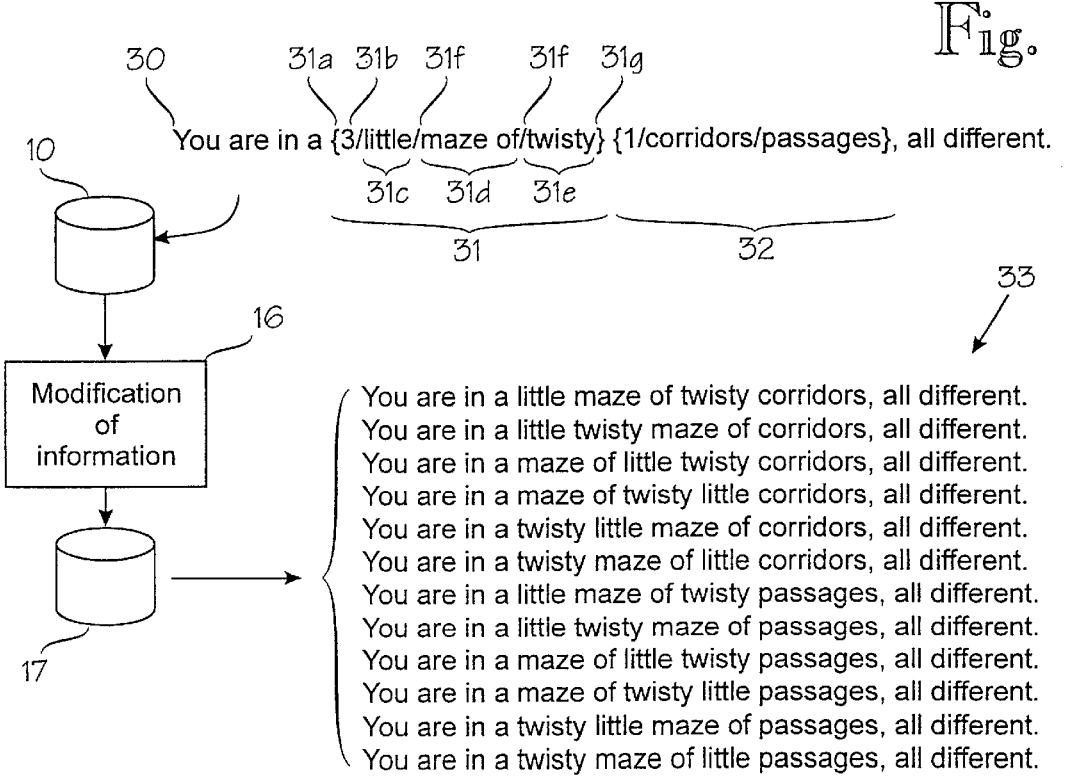
FIGS. 3 to 5 illustrate modifying a source file on the basis of modification keys.

The number of possible permutations can be increased e.g. in such a way that when the random number 15a, 15b, etc. meets a certain additional condition, the list of alternatives is read from right to left. The additional condition can be, for example, that the random number is an even number or that it is closer to the upper limit of the part than to the lower limit. With only three alternatives, six permutations are thus obtained. In FIG. 3 reference 33 indicates that even one simple sentence generates 12 different permutations.

Figure 4:
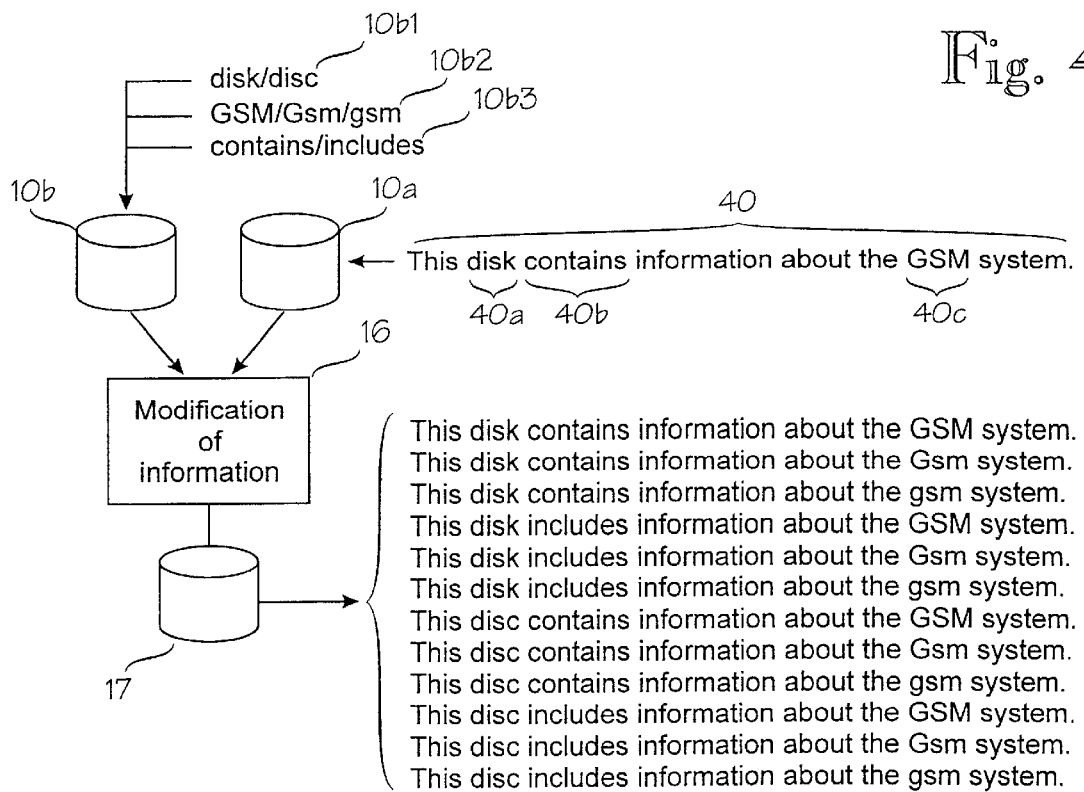

FIG. 4 shows an embodiment in which the lists of alternative bit strings are not combined with the source file 10, as in the embodiment of FIG. 3. In FIG. 4 source file 10a comprises only substantial information, exemplified by sentence 40. The list of alternative bit strings is stored in its own file 10b, which contains files 10b1, 10b2, 10b3, etc. In this embodiment, the modification block 16 processes source file 10a. At sentence 40, which serves as an example, the modification block 16 recognizes bit strings 40a, 40b and 40c, which are also stored in alternative bit string file 10b. As the recognition takes place, the modification block 16 modifies the information read from source file 10b, and creates a target file 17 in almost the same way as described in connection with FIG. 3. Even here 12 permutations can be generated from a simple sentence 40 by three alternative bit strings 10b1–10b3.

Figure 5:
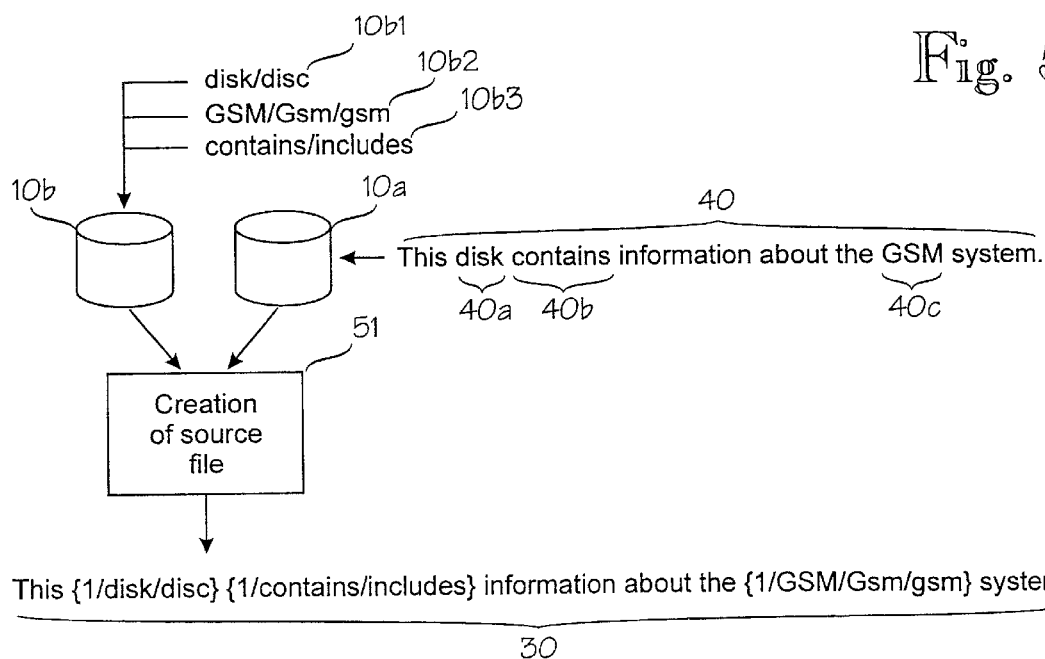

The embodiments of FIGS. 3 and 4 can also be used together, as shown in FIG. 5. In this embodiment, block 51 automatically identifies those bits strings (here 40a–40c) of the sentences (which are exemplified by sentence 40) of source file 10a for which an alternative bit string is defined in records 10b1–10b3 of file 10b. Block 51 automatically creates a source file 10 whose content is of the same form as sentence 30 in FIG. 3. Such an automatically generated, combined source file can be supplemented manually before it is supplied to the modification block 16 according to the invention.

In FIGS. 3 and 4 the sentences 30 and 40 to be modified are simple sentences written in English. The sole reason for this is to make the operation of the invention more readily understandable. It is thus not essential to the invention what kind of information the files 10, 10a and 10b contain. The modification block 16 operates by simple mechanic rules of conclusion, and it does not understand the content of the source file 10 or target file 17. With respect to the modification block 16, the lists of alternatives 31, 32, etc. can be any bit strings whatsoever. In fact, the different permutations of sentence 30 in FIG. 3 are not exact synonyms of one another; their information content, however, differs so little that the difference is not significant.

An alternative for storing possible modifications beforehand either in the source file 10 or in a separate modification file 10b is that the modifications are made on the basis of a suitable algorithm upon creating each separate target file 17, whereby the modifications can be stored in the modification block, or modification program 16. For example, let us assume that the supplier wants to protect a product catalogue intended for retailers, the catalogue possibly containing confidential information. The product catalogue contains product numbers, and to the corresponding bit strings extra redundancy can be added by interleaving in them bits formed from modification keys. With a 10-bit code, 1024 retailers can be separated from one another. For example, let the product number be 98765, the 20-bit binary presentation of which is 00011000000111001101. For example, one bit derived from the modification key can thus be interleaved between two bits of the product number. Each retailer would then receive a product list with individual product numbers. When a retailer makes an order, the extra bits are deleted automatically. If such a list of products is found in the possession of an unauthorized user, the origin of the confidential information can be concluded from the bits added.

In the above embodiments the nature of the modification depends on the modification keys 15a–15e generated on the basis of the user identifier 12a. Alternatively, the modification keys can define the position of the modification rather than the nature of the modification. For example, a repetitive modification can be generated in a video signal, the distance between the modifications being defined on the basis of the modification keys 15a-15e. This kind of modification means, for example, that the mutual order of two video frames is changed, or that the bits of a video frame are modified so that the checksum calculated from the bits is a predefined number, such as zero.

The structure of the distribution channel 17 is usually dependent on the user identification block 12. If the user orders a product by mail, the distribution channel 17 refers, for example, to the delivery of a diskette by mail. Particular attention should be paid to distribution of electronic documents in an electric network, such as the Internet. The syntax of the lists of alternatives 31 and 32 described in FIG. 3 can be implemented in an Internet server, for example as described below.

Figure 6:
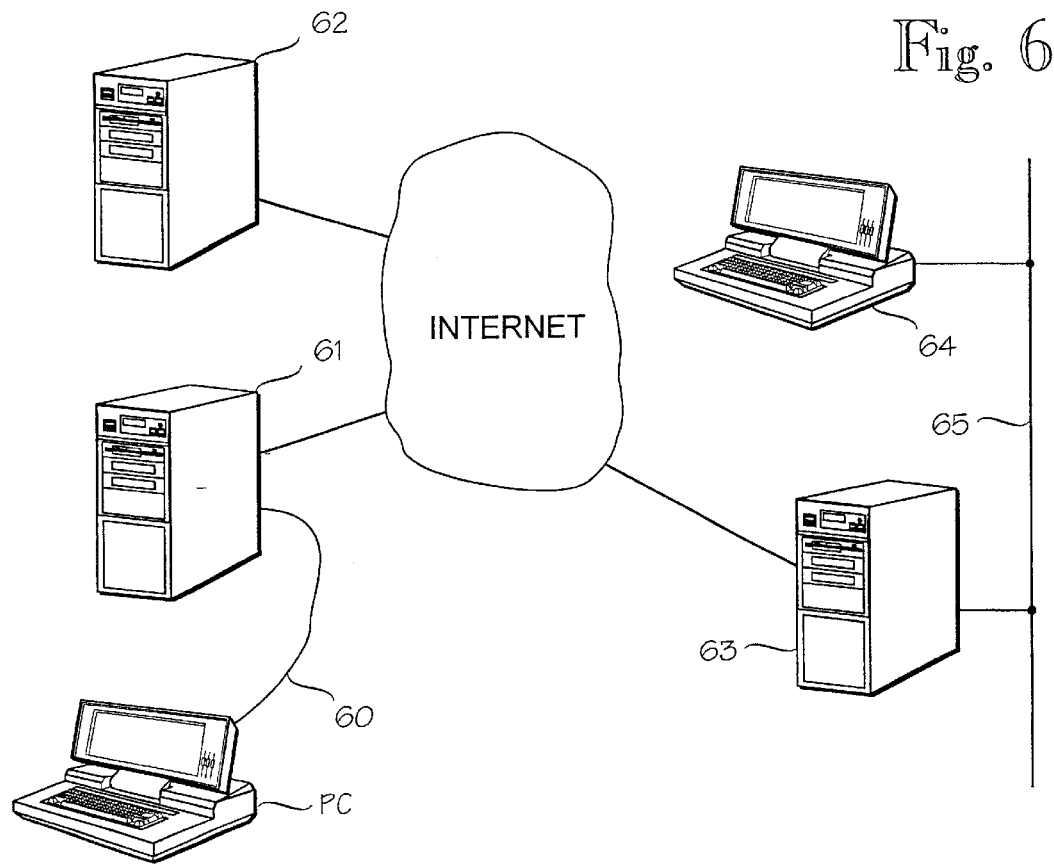
FIG. 6 illustrates delivery of documents through the Internet.

Let us now study FIG. 6. In the prior art, information suppliers distribute information via servers, which are commonly called Web servers and are represented by a computer indicated by reference 63 in FIG. 6. The PC user communicates with the Internet via a browser. The connection can be established, for example, via a modem 60 to the network operator's communications server 61. Let us assume that the PC user wants to establish a connection with a Web server 63 having an identifier of the form 'http://www.xxx.yy', where xxx is a firm identifier, and yy is a specifier, such as a country code. The network forwards the request to a Domain Name Server (DNS) 62, which tells the TCP/IP address of server 63, on the basis of which the network establishes a connection from the user's PC to server 63. The Web server 63 sends information to the user's PC, the information usually being a HyperText Markup Language (HTML) document. The service provider (copyright proprietor) can publish information in the Internet, for example, such that the Web server 63 is connected through a local area network 65 to other computers 64 of the same firm, which produce the information. Alternatively, the server 63 can be the network operator's computer, whereby the service provider can maintain the information contained in the server 63 either by sending diskettes to the operator or via a connection 60–61 like the one on which the PC user communicates with the Internet. The documents transmitted through the Internet can contain simple text or entire multimedia programs.

When the user has found interesting information, he can give the browser the command 'print' or 'save', whereby the printer prints the information or the information is stored in the memory. The storing is problematic for the information provider, for the browsers usually store the information with the HTML commands. The lists of alternative bit strings described in connection with FIGS. 3 to 5 must not be forwarded to the user under any circumstances whatsoever. In the invention, the operation of the Web server is expanded as follows. The HTML language is expanded by an additional command that can be e.g. the verb 'pick'. Sentence 30 of FIG. 3, expanded with the HTML in accordance with the present invention, would thus read as follows:

You are in a <pick 3, 'little', 'maze of', 'twisty'>

<pick 1, 'corridors', 'passages'>, all different.

As regards the verb 'pick', the Web server expanded in accordance with the invention generates a different sentence for each user, as described in connection with FIG. 3. The Web server forwards only the final sentence to the user via the Internet, the final sentence in the example of FIG. 3 being one of sentences 33, from which any occurrences of the verb 'pick' and any unused alternatives have been deleted.

The Internet also comprises proxy servers, which are not shown separately in FIG. 6. The proxy servers reduce the load on international connections by storing the last-read pages of information in the memory. If the same page is read several times in succession, the page is read once from the information provider's server, but after that from the proxy server. There is a risk that if there are two users A and B and the latter copies information without authorization, the information content may refer to user A. In fact, the information copied without authorization does not include anything that would refer to the dishonest user B. However, user B can probably be exposed on the basis of the log file maintained by the operator. It is possible to conclude from the information copied without authorization who the information has been delivered to. Proxy servers usually have a time limit, e.g. 24 hours, and no information that is older than that is kept in the memory. It is then possible to conclude from the log who have requested information substantially simultaneously, so the number of suspected users is limited to a very small group of users.

It is a time-consuming process to prove an alleged copyright infringement in court. Technology can be used for preventing new infringements such that the Web server is provided with a list of blocked users that prevents (e.g. on the basis of the electronic address) creation of a service to a user that is suspected of having published information without authorization.

The copyright can be later proved more easily if it is possible to show—without any doubt—that the source file has been in existence on a certain day. This can be proved, for example, by calculating from the source file a multibyte cyclic checksum using a known algorithm, and publishing the checksum in a means of communication.

When the material provider later detects a document that he suspects to have been copied illegally, he can find out who the information in question has been delivered to, e.g. by testing which user identifier gives a document that is identical to the one that is suspected to be a pirate copy. 20 Since it is also possible that the user has modified the document he has 'borrowed', it is possible to define, for example, a certain coefficient of correlation or some other corresponding threshold value. To expose an unauthorized copy, it is not necessary that a whole document has been copied: copying of even part of a document is sufficient. As shown above, even one simple sentence can yield 12 permutations. Two such sentences yield 144 permutations, and six sentences yield about three million. Since the copyright allows reasonable borrowing, it is not worthwhile to even try and expose small-scale borrowing.

Since modifications have to be made in several locations of the source file, it is evident that the only reasonable way to make the modifications is to use a computer or some other digital processor. The number of modifications needed must be estimated specifically for each case. As a rule, there must be so many modifications that even large-scale modification of a copied document can be exposed or at least made uneconomic. In the long run, the information provider will have a large library of alternative expressions, which can be utilized in various documents. If all the alternative expressions and other modifications are made by the same author as the actual text to be protected, the author owns the copyright on all the computer-made modifications. The computer and software do thus not add any contributions of their own that could interfere with the idea of the copyright.

It is naturally advantageous to use all the above techniques in different combinations. In multimedia documents, which comprise voice and/or video information as well as text, the different parts can be protected in different ways. Even in other respects it will be obvious to the person skilled in the art that as technology advances, the basic idea of the invention can be implemented in many different ways. The invention and its embodiments are thus not limited to the above examples but can vary within the scope of the claims.

What is claimed is:

1. A method of marking information to be produced in order to expose unauthorized publication of said information, the method comprising the steps of:

defining a user identifier, creating a source file containing said information to be marked, and creating a different target file for each user on the basis of the source file and the user identifier, storing, in a file, predefined modification rules for modifying the information contained in the source file, and, by means of a digital processor, generating a sequence of modification keys on the basis of the user identifier, and defining the locations in the source file to be modified and making modifications in these locations, determining at least one of the nature and position of the modifications on the basis of the predefined modification rules and modification keys;

wherein the source file comprises a first part containing actual information, and a second part containing formatting instructions, and that modifications are made in said first part.

2. A method according to claim 1, wherein a number of predefined modifications are stored in the source file.

3. A method according to claim 1, wherein a number of predefined modifications are stored in a separate modification file.

4. A method according to claim 1, wherein a number of predefined modification rules are stored in a modification program.

5. A method according to claim 1, wherein the modifications are stored in the source file as bit strings comprising at least a start character, a stop character, and a number of alternative bit strings, from which at least one is written into the source file at the modification concerned, and that when the source file is modified to form a target file, the positions of the modifications are determined on the basis of the positions of the bit strings in the information contained in the source file.

6. A method according to claim 1, wherein the actual information is human-readable plaintext.

7. A method of marking information to be produced in order to expose unauthorized publication of said information, the method comprising the steps of:

defining a user identifier, creating a source file containing said information to be marked, and creating a different target file for each user on the basis of the source file and the user identifier, storing, in a file, predefined modification rules for modifying the information contained in the source file, and, by means of a digital processor, generating a sequence of modification keys on the basis of the user identifier, and defining the locations in the source file to be modified and making modifications in these locations, determining at least one of the nature and position of the modifications on the basis of the predefined modification rules and modification keys;

wherein the modifications are stored in the source file as bit strings comprising at least a start character, a stop character, and a number of alternative bit strings from which at least one is written into the source file at the modification concerned, and that when the source file is modified to form a target file, the positions of the modifications are determined on the basis of the positions of the bit strings in the information contained in the source file; and wherein the modifications are stored as bit strings, which also define a number indicating how many alternative bit strings are written into the target file at the modification concerned.

8. A method of marking information to be produced in order to expose unauthorized publication of said information, the method comprising the steps of:

defining a user identifier, creating a source file containing said information to be marked, and creating a different target file for each user on the basis of the source file and the user identifier, storing, in a file, predefined modification rules for modifying the information contained in the source file, and, by means of a digital processor, generating a sequence of modification keys on the basis of the user identifier, and defining the locations in the source file to be modified and making modifications in these locations, determining at least one of the nature and position of the modifications on the basis of the predefined modification rules and modification keys;

wherein a number of predefined modifications are stored in a separate modification file;

further comprising storing the modification rules in a separate modification file as lists of alternative bit strings, and, when the source file is modified to create a target file;

recognizing, from the information contained in the source file, bit strings for which a list of alternative bit strings has been defined, and in response to the recognition, replacing the bit string of the source file with at least one alternative bit string obtained from the list of bit strings that are alternative to the bit string of the source file.

9. A method of marking information to be produced in order to expose unauthorized publication of said information, the method comprising the steps of:

defining a user identifier, creating a source file containing said information to be marked, and creating a different target file for each user on the basis of the source file and the user identifier, storing, in a file, predefined modification rules for modifying the information contained in the source file, and, by means of a digital processor, generating a sequence of modification keys on the basis of the user identifier, and defining the locations in the source file to be modified and making modifications in these locations, determining at least one of the nature and position of the modifications on the basis of the predefined modification rules and modification keys;

wherein a number of predefined modification rules are stored in a modification program; and wherein, in a direction in which the information passes from an information provider to the user, bits derived from the modification keys are interleaved with bits of information contained in the source file, and in the reverse direction the bits added by interleaving are ignored.

10. A system for marking information to be produced in order to expose unauthorized publication of information, the system comprising means for defining a user identifier, a source file containing the information to be marked, and processing means for creating a different target file for each user on the basis of the source file and the user identifier, a file storing predefined modification rules in order to modify the information contained in the source file, processing means for generating a sequence of modification keys on the basis of the user identifier, and that the processing means are arranged to define the locations of the source file to be modified, and to make modifications in these locations, wherein at least on of the nature and position of the modification is determined on the basis of the modification rules and modification keys, wherein the source file comprises a first part containing actual information, and a second part containing formatting instructions, and that modifications are made in said first part.

* * * * *